US012572288B2

(12) United States Patent
Eswaran et al.

(10) Patent No.: US 12,572,288 B2
(45) Date of Patent: Mar. 10, 2026

(54) COORDINATED STORAGE TIERING ACROSS SITES

(71) Applicant: INTERNATIONAL BUSINESS MACHINES CORPORATION, Armonk, NY (US)

(72) Inventors: Anand Eswaran, Bengaluru (IN); Mudit Verma, New Delhi (IN); Aishwariya Chakraborty, Bankura (IN); Praveen Jayachandran, Bangalore (IN); Pankaj Thorat, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 18/521,309

(22) Filed: Nov. 28, 2023

(65) Prior Publication Data
US 2025/0173074 A1 May 29, 2025

(51) Int. Cl.
*G06F 3/00* (2006.01)
*G06F 3/06* (2006.01)

(52) U.S. Cl.
CPC .......... *G06F 3/0629* (2013.01); *G06F 3/0604* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 9,916,311 B1* | 3/2018 | Bent | ....................... | G06F 16/13 |
| 10,025,802 B2 | 7/2018 | Vermeulen | | |
| 2023/0300193 A1* | 9/2023 | Narayanam | ........... | H04L 67/561 |
| | | | | 709/224 |
| 2024/0086069 A1* | 3/2024 | Dong | ..................... | G06F 3/061 |

OTHER PUBLICATIONS

F. Jiang, et al., "Cachalot: A Network-Aware, Cooperative Cache Network for Geo-Distributed, Data-Intensive Applications," IEEE, NOMS 2018-2018 IEEE/IFIP Network Operations and Management Symposium, Jul. 9, 2018, 11 pp.
"Geo-distributed Analytics with NetApp StorageGRID and Alluxio," NetApp, Solution Brief, 2022, 4 pp.

(Continued)

*Primary Examiner* — Midys Rojas
(74) *Attorney, Agent, or Firm* — KONRAD, RAYNES, DAVDA & VICTOR LLP; Rabindranath Dutta

(57) ABSTRACT

Provided are a method, system, and computer program product in which operations are performed to provide a plurality of configurations that indicate storage requirements of different storage tiers of a tiered storage system for a plurality of sites, wherein each of the plurality of configurations has an associated priority. Operations are performed to determine a configuration with a highest priority of the plurality of configurations, wherein storage tiers at each site of the plurality of sites are configurable in an identical manner in accordance with the determined configuration. The storage tiers of each site of the plurality of sites are configured in the identical manner in accordance with the determined configuration.

20 Claims, 12 Drawing Sheets

(56) References Cited

OTHER PUBLICATIONS

I. Narayanan, et al., "Right-sizing Geo-distributed Data Centers for Availability and Latency", IEEE, 2017, 11 pp.

W. Lyu, et a., "Sapphire: Automatic Configuration Recommendation for Distributed Storage Systems," arXiv:2007.03220v1, Jul. 7, 2020, 12 pp.

P. Li, et al., "Traffic-aware Task Placement with Guaranteed Job Completion Time for Geo-distributed Big Data," IEEE ICC 2017 SAC Syposium Big Data Networking Track, 2017, 6 pp.

K. Oh, et al., "Wiera: Policy-Driven Multi-Tiered Geo-Distributed Cloud Storage System," IEEE Transactions on Parallel and Distributed Systems, vol. 0, No. 0, Jan. 2019, 2019, 12 pp.

M. Abdi, et al., "A Community Cache with Complete Information," USENIX, Proceedings of the 19th USENIX Conference on File and Storage Technology, Feb. 21-23, 2023, 17 pp.

G. Ananthanarayanan, et al., "Pacman: Coordinated Memory Chaching for Parallel Jobs," USENIX, 2 pp.[online] [retrieved Nov. 28, 2023] https://www.usenix.org/conference/nsdi12/technicaal-sessions/presentation/ananthanarayanan.

T.B.G. Perez, et al., "Reference-distance Eviction and Prefetching for Cache Management in Spark," ACM, 2018, 10 pp.

M. Bergui, et al., "A survey on bandwidth-aware geo-distributed frameworks for bi-data analytics", Journal of Big Data, 2021, 26 pp.

Y. Lu, et al., "DAG-Aware Joint Task Scheduling and Cache Management in Spark Clusters," IEEE, 2020 IEEE International Parallel and Distributed Processing Symposium (IPDPS), 2020, 10 pp.

* cited by examiner

Co-Tier configuration showing exemplary code

```
Co-Tier-Stage-Dedup {
    Stage : Dedup
    Auto-Tune : True,
    Co-Tier-ConfigSet1 {
        utility : 0.9,
        Co-Tier-Config-Flash1 {
            storage_class : FLASH,
            capacity : ["IBM_EUR" : 400G,   "AWS_USWEST" : 400 G,
"GCE_USEAST" : 400 G],
        },
        Co-Tier-Config-COS1 {
            storage_class : COS,
            capacity : ["IBM_EUR" : 4 T,  "AWS_USWEST" : 4 T,  "GCE_USEAST" :
4 T],
        },
    Co-Tier-ConfigSet2 {
        utility : 0.6,
        Co-Tier-Config-Flash2 {
            storage_class : FLASH,
            capacity : ["IBM_EUR" : 200G,   "AWS_USWEST" : 200 G,
"GCE_USEAST" : 200 G],
        },
        Co-Tier-Config-COS2 {
            storage_class : COS,
            capacity : ["IBM_EUR" : 4 T,  "AWS_USWEST" : 4 T,  "GCE_USEAST" :
4 T],
        }
    }
}
```

Figure 10:
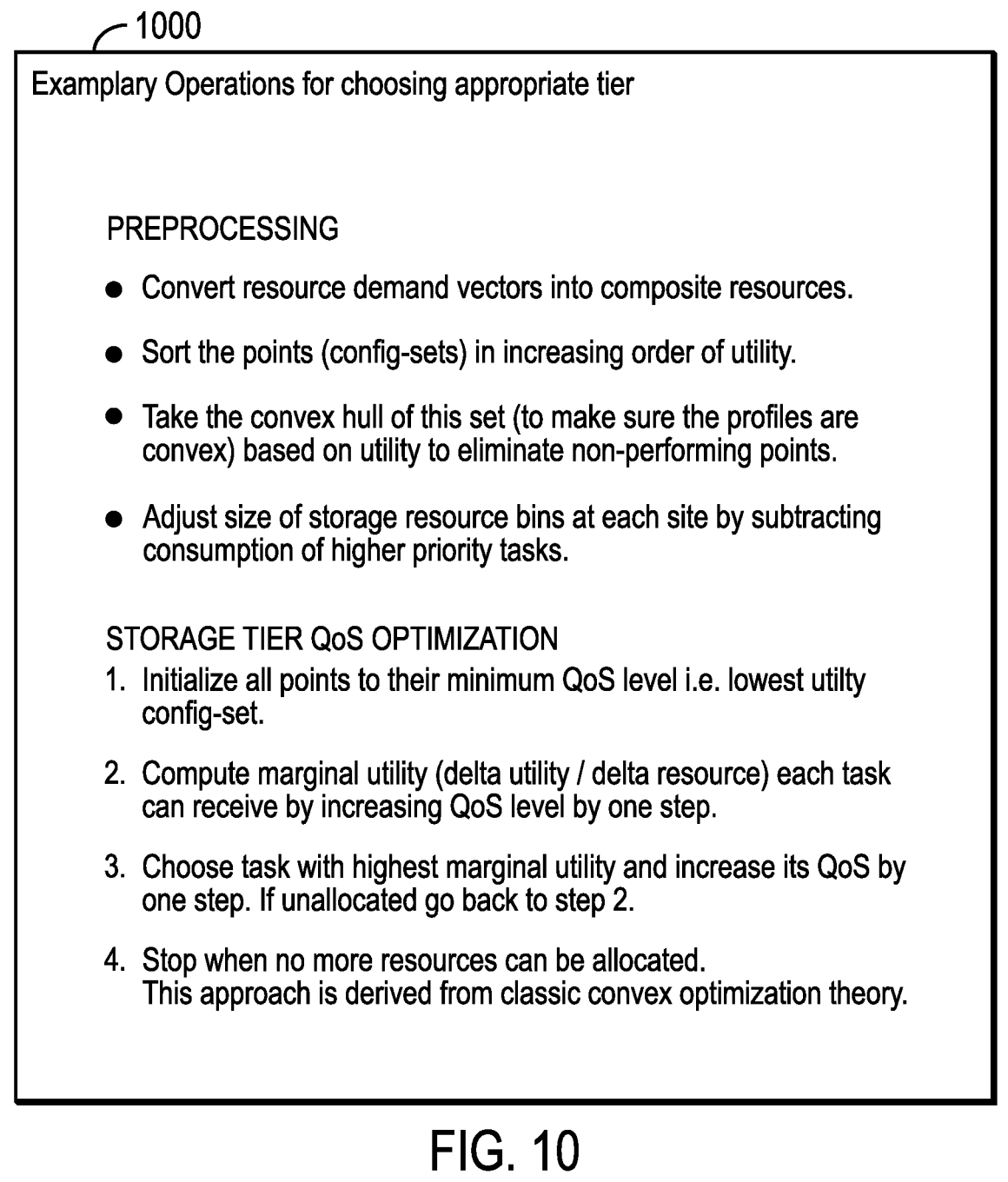

1000

Examplary Operations for choosing appropriate tier

PREPROCESSING

- Convert resource demand vectors into composite resources.

- Sort the points (config-sets) in increasing order of utility.

- Take the convex hull of this set (to make sure the profiles are convex) based on utility to eliminate non-performing points.

- Adjust size of storage resource bins at each site by subtracting consumption of higher priority tasks.

STORAGE TIER QoS OPTIMIZATION

1. Initialize all points to their minimum QoS level i.e. lowest utilty config-set.

2. Compute marginal utility (delta utility / delta resource) each task can receive by increasing QoS level by one step.

3. Choose task with highest marginal utility and increase its QoS by one step. If unallocated go back to step 2.

4. Stop when no more resources can be allocated.
   This approach is derived from classic convex optimization theory.

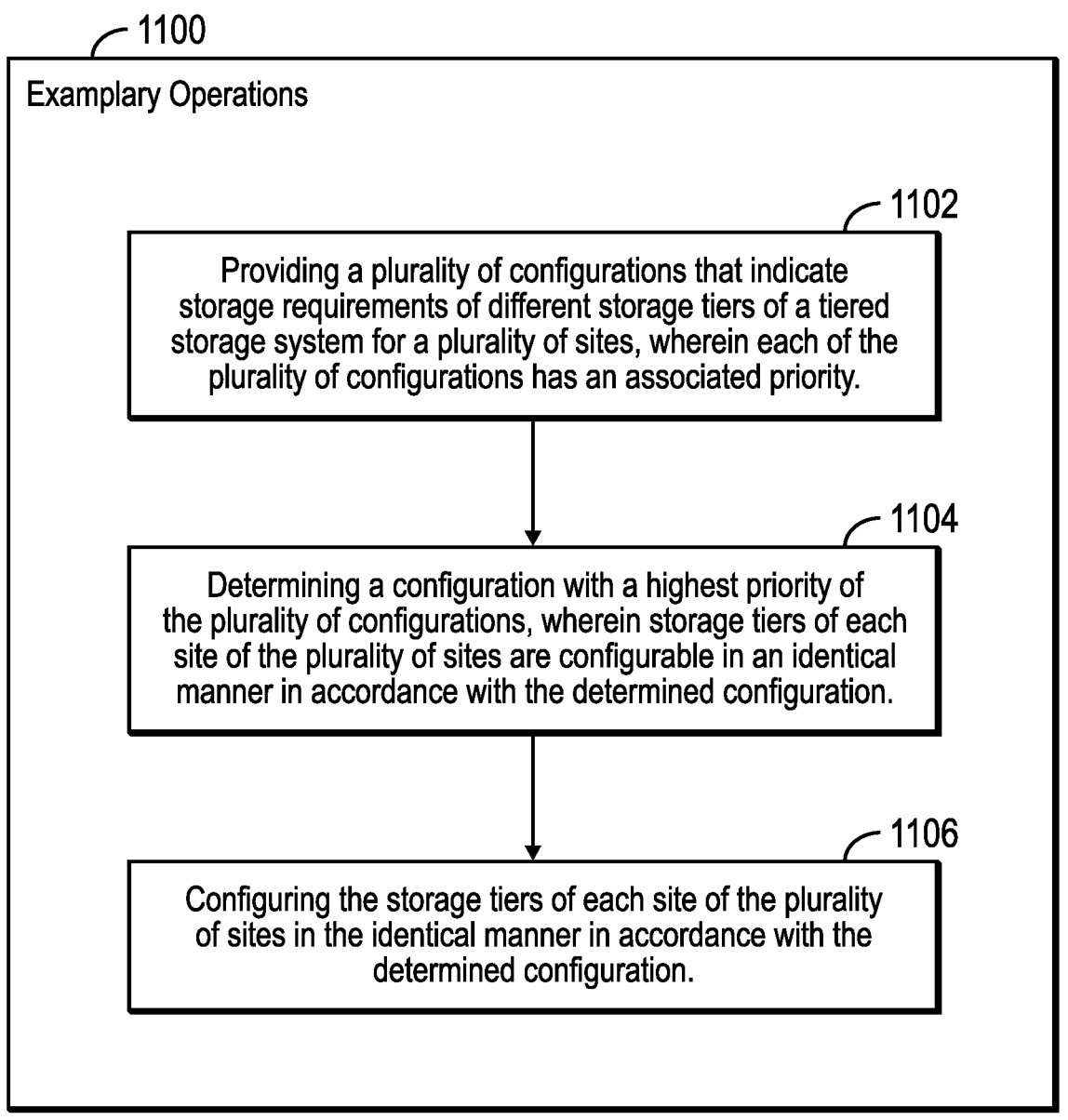

Examplary Operations

1102

Providing a plurality of configurations that indicate
storage requirements of different storage tiers of a tiered
storage system for a plurality of sites, wherein each of the
plurality of configurations has an associated priority.

1104

Determining a configuration with a highest priority of
the plurality of configurations, wherein storage tiers of each
site of the plurality of sites are configurable in an identical
manner in accordance with the determined configuration.

1106

Configuring the storage tiers of each site of the plurality
of sites in the identical manner in accordance with the
determined configuration.

COORDINATED STORAGE TIERING ACROSS SITES

BACKGROUND

Embodiments relate to a method, system, and computer program product for coordinated storage tiering across sites.

Organizations may produce huge volumes of data that are distributed across multiple data centers, where the multiple data centers may be located at different geographical locations. The geographically distributed data centers may be referred to as geo-distributed data centers. A geo-distributed data processing framework assigns computations to be performed at locations where data is located and then aggregate the outputs of these computations at a single site to perform analytics, and the process may be referred to as performing geo-distributed analytics.

Tiered storage is a data storage method or system that comprises two or more storage media types, such as flash drives, hard disk drives, magnetic tape drives, etc. The media type used to store a category of data may be determined by several factors, including media cost, data availability requirements, etc. Certain storage tiers may have a lower storage capacity but a higher performance in comparison to other tiers. For example, a solid-state drive (SSD) based storage tier may have a higher performance but a lower storage capacity in comparison to a hard disk drive (HDD) based storage tier. In certain mechanisms, a first storage tier may be a local storage tier, whereas as second storage tier may be a cloud-based storage tier, where the local storage tier has a higher performance but a lower storage capacity in comparison to the cloud-based storage tier.

SUMMARY

Provided are a method, system, and computer program product in which operations are performed to provide a plurality of configurations that indicate storage requirements of different storage tiers of a tiered storage system for a plurality of sites, wherein each of the plurality of configurations has an associated priority. Operations are performed to determine a configuration with a highest priority of the plurality of configurations, wherein storage tiers at each site of the plurality of sites are configurable in an identical manner in accordance with the determined configuration. The storage tiers of each site of the plurality of sites are configured in the identical manner in accordance with the determined configuration.

In additional embodiments, operations are performed to place a plurality of tasks of a stage across the plurality of sites, wherein each task of the plurality of tasks complete at each site of the plurality of sites within a time period that does not differ from a time period of completion of other tasks of the plurality of tasks by more than a predetermined time period.

In yet additional embodiments, each task of the plurality of tasks is an instance of the stage. The plurality of tasks are distributed among the plurality of sites from a central server.

In further embodiments, operations perform a coordinated storage tiering across the plurality of sites to generate geo-distributed analytics at the central server.

In yet further embodiments completion times of a plurality of tasks are achieved in a most cost-efficient and resource-efficient manner possible.

In certain embodiments, operations are performed to dynamically adapt the plurality of configurations in a coordinated manner across participating sites of a stage in a dynamic setting.

In further embodiments, operations are performed for dynamically right-sizing storage tier resource demands requested by each task at each site based on observed activity for system-wide overall performance and improving overall utilization of all storage tiers at the plurality of sites without affecting stage-wide performance guarantees.

BRIEF DESCRIPTION OF THE DRAWINGS

Referring now to the drawings in which like reference numbers represent corresponding parts throughout:

FIG. 5 illustrates a block diagram that shows a co-tier configuration showing exemplary code, in accordance with certain embodiments.

FIG. 10 illustrates a block diagram of exemplary operations for choosing appropriate tier, in accordance with certain embodiments.

FIG. 11 illustrates exemplary operations for coordinated storage tiering across sites, in accordance with certain embodiments.

DETAILED DESCRIPTION

Figure 1:
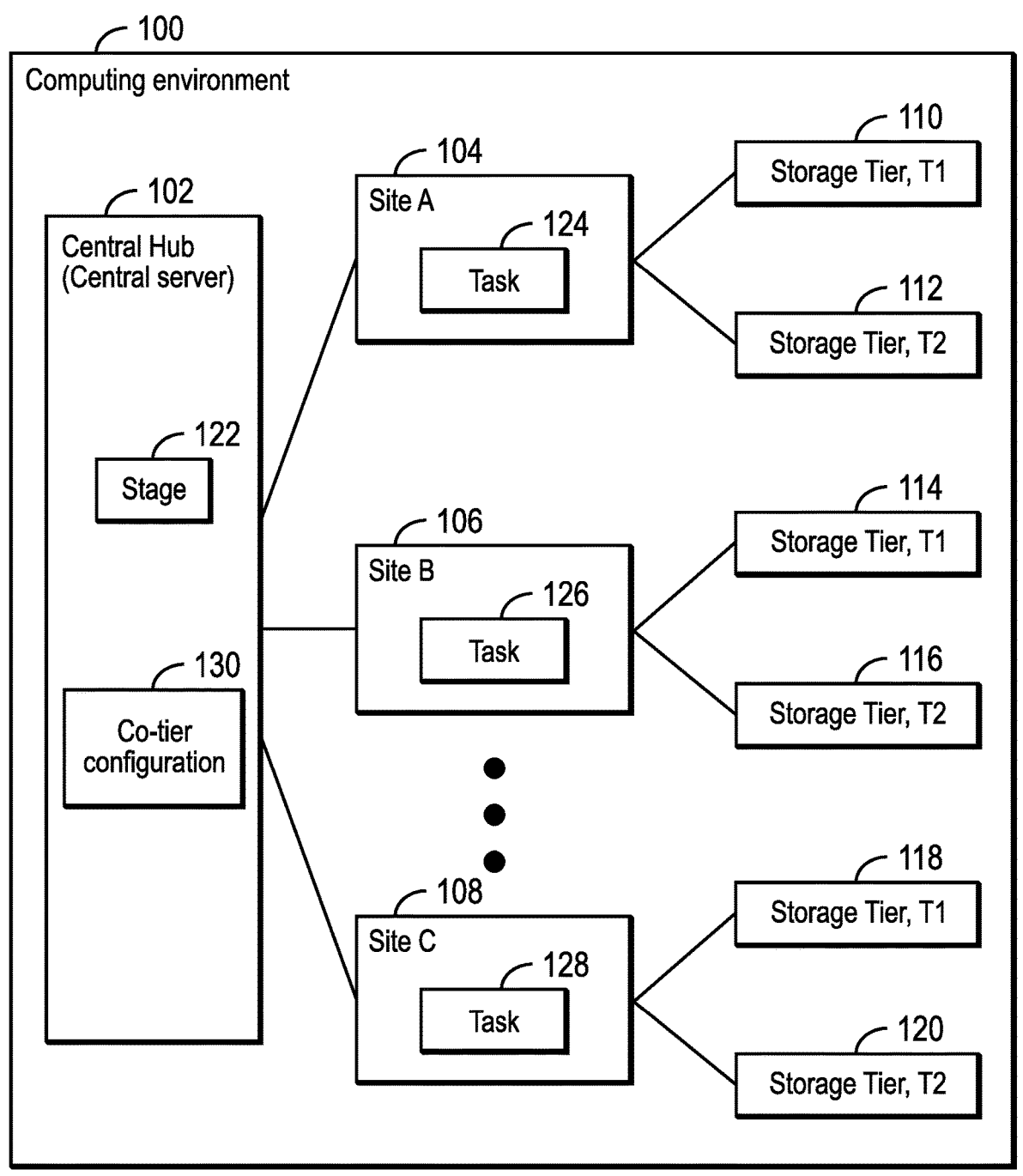
FIG. 1 illustrates a block diagram of a computing environment, in accordance with certain embodiments.

In the following description, reference is made to the accompanying drawings which form a part hereof and which illustrate several embodiments. It is understood that other embodiments may be utilized, and structural and operational changes may be made. Several examples will now be provided to further clarify various embodiments of the present disclosure.

Example 1: A method in which operations are performed to provide a plurality of configurations that indicate storage requirements of different storage tiers of a tiered storage system for a plurality of sites, wherein each of the plurality of configurations has an associated priority. Operations are performed to determine a configuration with a highest priority of the plurality of configurations, wherein storage tiers at each site of the plurality of sites are configurable in an identical manner in accordance with the determined configuration. The storage tiers of each site of the plurality of sites are configured in the identical manner in accordance with the determined configuration. As a result, jobs complete relatively faster in a multi-computer environment with tiered storage along with efficient utilization of storage resources, in comparison to prior art.

Example 2: The limitations of any of Examples 1 and 3-7, where operations are performed to place a plurality of tasks of a stage across the plurality of sites, wherein each task of the plurality of tasks complete at each site of the plurality of sites within a time period that does not differ from a time period of completion of other tasks of the plurality of tasks by more than a predetermined time period. As a result, the plurality of tasks at each site complete substantially simultaneously.

Example 3: The limitations of any of Examples 1-2 and 4-7, where in yet additional embodiments, each task of the plurality of tasks is an instance of the stage. The plurality of tasks are distributed among the plurality of sites from a central server. As a result, the plurality of tasks complete substantially simultaneously.

Example 4: The limitations of any of Examples 1-3 and 5-7, where in further embodiments, operations perform a coordinated storage tiering across the plurality of sites to generate geo-distributed analytics at the central server. As a result, improvements take place in the computation of geo-distributed analytics.

Example 5: The limitations of any of Examples 1-4 and 6-7, where in yet further embodiments completion times of a plurality of tasks are achieved in a most cost-efficient and resource-efficient manner possible. As a result, lower costs are incurred and lower amount of resources are needed.

Example 6: The limitations of any of Examples 1-5 and 7, where in certain embodiments, operations are performed to dynamically adapt the plurality of configurations in a coordinated manner across participating sites of a stage in a dynamic setting. As a result, dynamic adjustments are made to the plurality of configurations.

Example 7: The limitations of any of Examples 1-6, where in further embodiments, operations are performed for dynamically right-sizing storage tier resource demands requested by each task at each site based on observed activity for system-wide overall performance and improving overall utilization of all storage tiers at the plurality of sites without affecting stage-wide performance guarantees. As a result, the size of storage tier resources that are allocated are dynamically adjusted.

Example 8: A system, comprising a memory, and a processor coupled to the memory, where the processor performs operations, the operations comprising performing a method according to any one of Examples 1-7. As a result, jobs complete relatively faster in a multi-computer environment with tiered storage along with efficient utilization of storage resources, in comparison to prior art.

Example 9: A computer program product, the computer program product comprising a computer readable storage medium having computer readable program code embodied therewith, the computer readable program code when executed is configured to perform operations, the operations comprising performing a method according to any of Examples 1-7. As a result, jobs complete relatively faster in a multi-computer environment with tiered storage along with efficient utilization of storage resources, in comparison to prior art.

In multi-cloud environments there is a recurring need for geo-distributed analytics across input data that is stored at different locations in geographically distributed datacenters. For example, in one scenario, a foundation model's pre-training input data may be present in multiple datacenters.

This is driven by the need to collocate compute close to data, and depends on the location of training data sets. In another scenario local analytics is performed at edge/spoke sites followed by aggregation at hub sites, and such processes may be driven by large volumes and data sovereignty considerations. Such patterns may be common across multiple workload-types such as those in information technology, Cyber-Security, or 5G telephony applications. In another scenario data integration may be driven by the need to centralize data generated by multiple sites in centralized enterprise data warehouses for unified business intelligence querying. In another scenario mechanisms may transparently use capabilities of multiple clouds for analytics and this may be driven by cost and unique capabilities offered by different cloud providers.

A wide range of scenarios as described above are handled flexibly via geo-distributed data processing spanning across datacenters Such frameworks simultaneously schedule multiple jobs concurrently. In certain mechanisms successive stages of the task graph of geo-distributed jobs may span a plurality of sites. Stages that are scheduled on multiple sites are as slow as the slowest task.

For stages of a geo-distributed analytics pipeline to be scheduled as fast as possible, the stage requires coordinated caching and processing across all locations that host that stage's tasks. Tasks that use slower storage tiers than others land up being stragglers (i.e., takes longer to complete) thus holding up the entire stage.

Certain embodiments provide mechanisms for coordinated caching and tier-selection across multiple sites in order to meet objectives of geo-distributed dataflows. As part of the tier-allocation tuning process, a dataflow engine may need to make following decisions:

(1) Which sites need to be used for implementing intermediate stages given the storage configuration options expressed in the intent directed acyclic graph (DAG) and given the capabilities discovered from the various clusters?

(2) Since storage consumption continuously changes in a dynamic cloud environment, what configuration-set points should be chosen for the current stage and how should other storage resources be apportioned across all contending stages/workloads such that the global utility of all tasks in the multi-cluster topology is maximized? Embodiments may have to balance data capacity and I/O cycles across sites and across tiers.

(3) How to auto-tune/right-size the storage configuration (data capacity and tier-assignment) of all stages across all sites based on monitored storage telemetry metrics?

In multi-cloud geo-distributed analytics, a significant fraction of overall execution time is spent in performing Input/Output (I/O) operations, such as reading from files or tables, or writing to files or tables. For heavy workloads these analytics jobs can leverage faster storage tiers such as memory and SSDs.

There are typically multiple workloads that are competing to consume storage resources. Faster storage tiers (e.g., RAM, NVMe) offer relatively higher performance, less capacity, whereas slower tiers (e.g., Block Storage, cloud object storage) are less expensive large capacity storage that provide relatively lower performance.

In edge sites, these fast storage tiers are scarce as they are typically more expensive. Injudicious allocation of storage tiers to tasks (e.g., allocating storage to low priority workloads or to high priority workloads that cannot benefit from the increased I/O bandwidth) can result in significantly larger job execution times. This extra I/O bandwidth can be reallocated to concurrent tasks of the same job scheduled at the same task or this I/O bandwidth can be apportioned to other tasks/jobs in the system.

Furthermore, in cloud settings, it may be desirable to allocate the lowest I/O bandwidth that meets the job service level agreement (SLA) requirements, where lower I/O bandwidth reduces cost. Thus, judicious storage tiering is key for both performance and cost reasons. For stages that implement operators such as shuffles/joins/reduce/group across multiple sites, mismanagement of storage at any one site can affect the entire stage. One task in a stage assigned to a slow tier could bottleneck the entire stage and thereby the entire pipeline.

Thus, the ability to coordinate storage tiering of tasks in a stage scheduled across multiple sites in a geo-distributed job for meeting end-to-end objectives (e.g., minimize job completion time) can be a differentiating capability and is performed by certain embodiments. As a result, improvements are made to the operation of a computational device or a group of computational devices in a distributed computing environment.

FIG. 1 illustrates a block diagram of a computing environment 100, in accordance with certain embodiments.

A central hub 102 is coupled to a plurality of sites 104, 106, 108, where each site is coupled to a plurality of storage tiers, where the central hub 102 is also referred to as a central server. For example, site 104 is coupled to storage tiers 110, 112, site 106 to storage tiers 114, 116, and site 108 to storage tiers 118, 120. The storage tiers 110, 114, 118 are of one type (T1) and the storage tiers 112, 116, 120 are of another type (T2). In certain embodiments, the T1 type of storage tier is a flash storage and the T2 type of storage is a cloud object storage. In FIG. 1, each site has some storage capacity for the T1 type of storage and some storage capacity for the T2 type of storage, where the T1 type of storage provides greater performance but lower storage capacity than the T2 type of storage.

The central hub 102 and the sites 104, 106, 108 may comprise any suitable computational device known in the art such as a mainframe, a personal computer, a laptop, a telephony device, etc. The central hub 102 and the sites 104, 106, 108 may be coupled by any suitable network that includes the Internet, a wide area network, etc., where the sites 104, 106, 108 are geographically dispersed and separated from one another.

The central hub includes a stage 122. Different instances of the stage 122 are executed in different sites, and the instances are referred to as tasks. For example, site 104 executes the task 124, site 106 executes the task 126, and site 108 executes the task 128, where the tasks 124, 126, 128 are instances of the stage 122. Data is stored in the sites and the tasks 124, 126, 128 process the data.

A data structure referred to as a co-tier configuration 130 is maintained in the central hub 102. The co-tier configuration 130 provides certain configurations of the storage tiers to be used by each site, where each site has to use the same configuration, so that the tasks 124, 126, 128 complete at more or less the same time (i.e., the time difference between completion of each of the tasks 124, 126, 128 from each other is less than a predetermined threshold that is small in comparison to the execution time of the tasks 124, 126, 128). When the same configuration of storage tiers is used by each site, then the tasks in each site complete at roughly the same time and storage resources are utilized efficiently.

Figure 2:
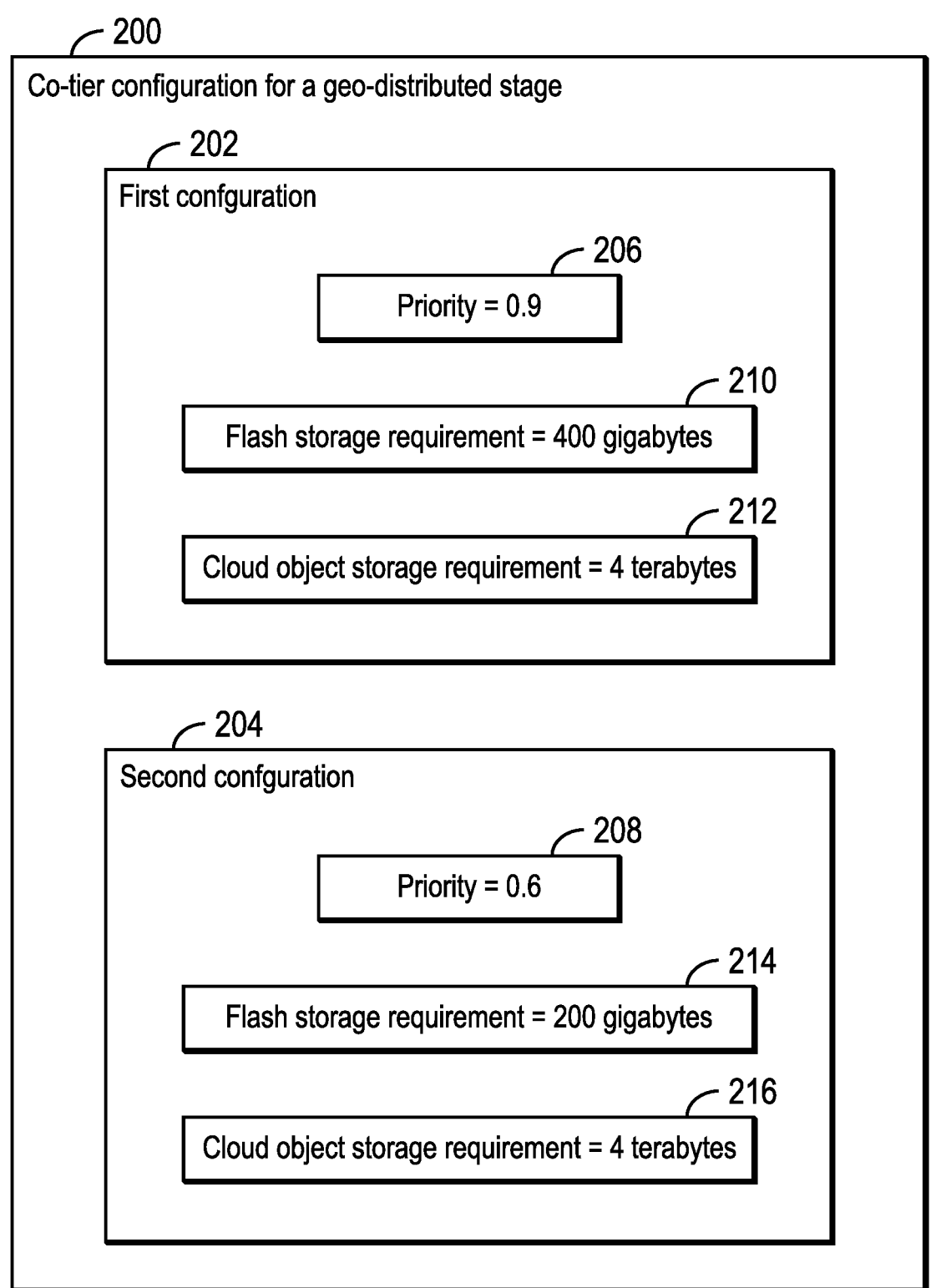
FIG. 2 illustrates a block diagram of a co-tier for a geo-distributed stage, in accordance with certain embodiments.

FIG. 2 illustrates a block diagram 200 of a co-tier configuration for a geo-distributed stage, in accordance with certain embodiments.

Two exemplary configurations referred to as the first configuration 202 and the second configuration 204 are shown. The first configuration 202 has a higher priority of 0.9 in comparison to the lower priority of 0.6 of the second configuration 204 (as shown via reference numerals 206, 208). The priority indicates the order in which the configurations should be tried for configuring each of the sites.

In the first configuration 202, the flash storage requirement is 400 gigabytes whereas the cloud object storage requirement is 4 terabytes (as shown via reference numerals 210, 212). In the second configuration 204 the flash storage requirement is 200 gigabytes whereas the cloud object storage requirement is 4 terabytes (as shown via reference numerals 214, 216).

In certain embodiments, the central hub 102 tries to configure the sites 104, 106, 108 with the first configuration 202 in which each site needs to allocate 400 gigabytes of flash storage and 4 terabytes of cloud object storage for a task. If this is not possible, then the second configuration 204 is tried to configure the storage of each site, and each site allocates 200 gigabytes of flash storage, and 4 terabytes of cloud object storage for a task. In either case, each of the tasks complete at substantially the same amount of time in the sites 104, 106, 108.

Figure 3:
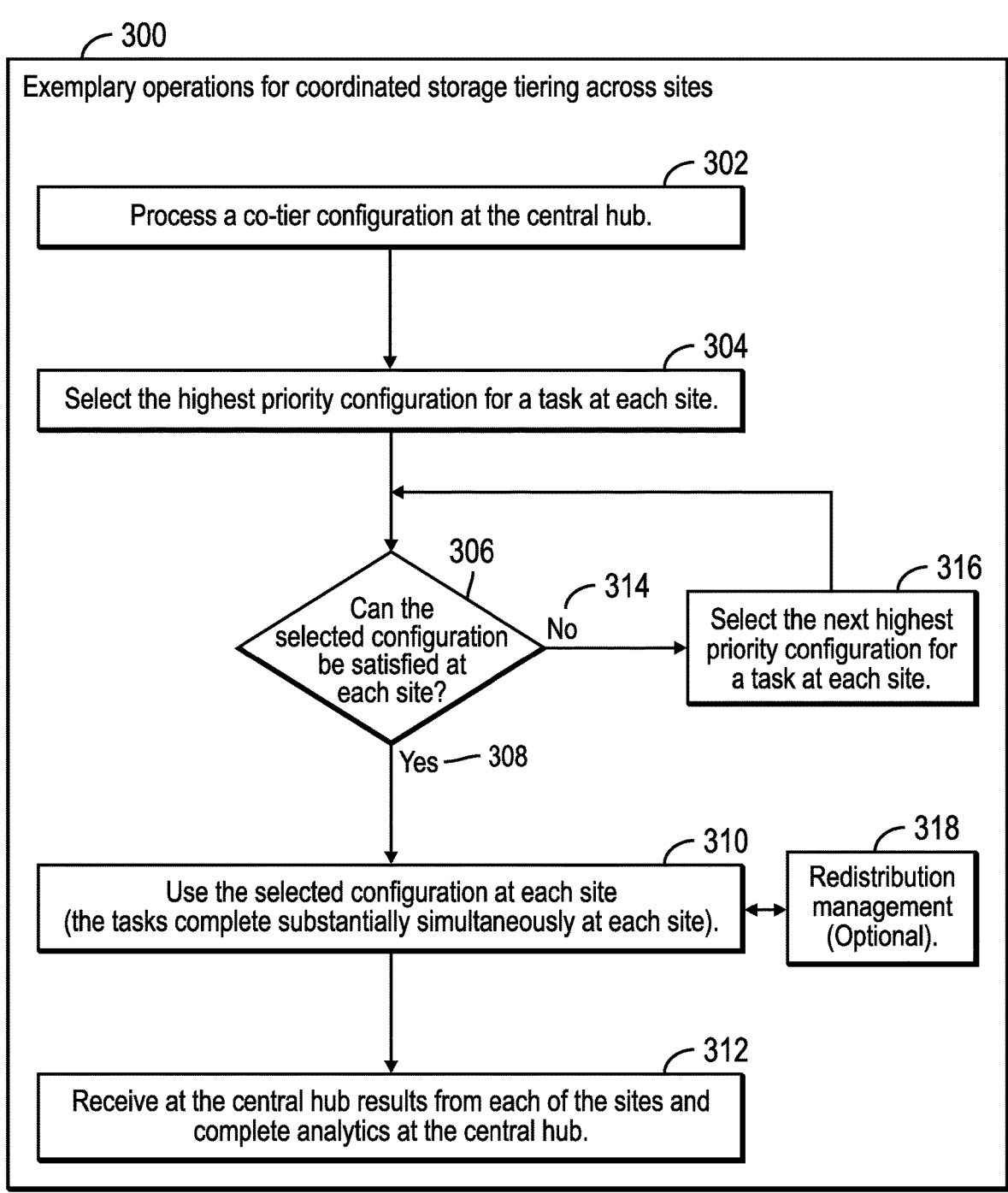
FIG. 3 illustrates a block diagram that shows exemplary operations for coordinated storage tiering across sites, in accordance with certain embodiments.

FIG. 3 illustrates a block diagram 300 that shows exemplary operations for coordinated storage tiering across sites, in accordance with certain embodiments.

Control starts at block 302 where a co-tier configuration is processed at the central hub 102.

Control proceeds to block 304 in which the process selects the highest priority configuration for a task at each site. A determination is made (at block 306) as to whether the selected configuration can be satisfied at each site. If so ("Yes" branch 308) control proceeds to block 310 in which the process uses the selected configuration at each site. As a result, the tasks complete substantially simultaneously at each site. Control proceeds to block 312 in which the central hub 102 receives results from each of the sites and completes analytics at the central hub 102.

If at block 306 a determination is made that the selected configuration cannot be satisfied at each site ("No" branch 314) then control proceeds to block 316 in which the process selects the next highest priority configuration for a task at each site and then control returns to block 306.

Redistribution management is performed optionally (at block 318) to dynamically reconfigure the allocation of storage in each of the sites, provided the reconfiguration is identical in each site.

Figure 4:
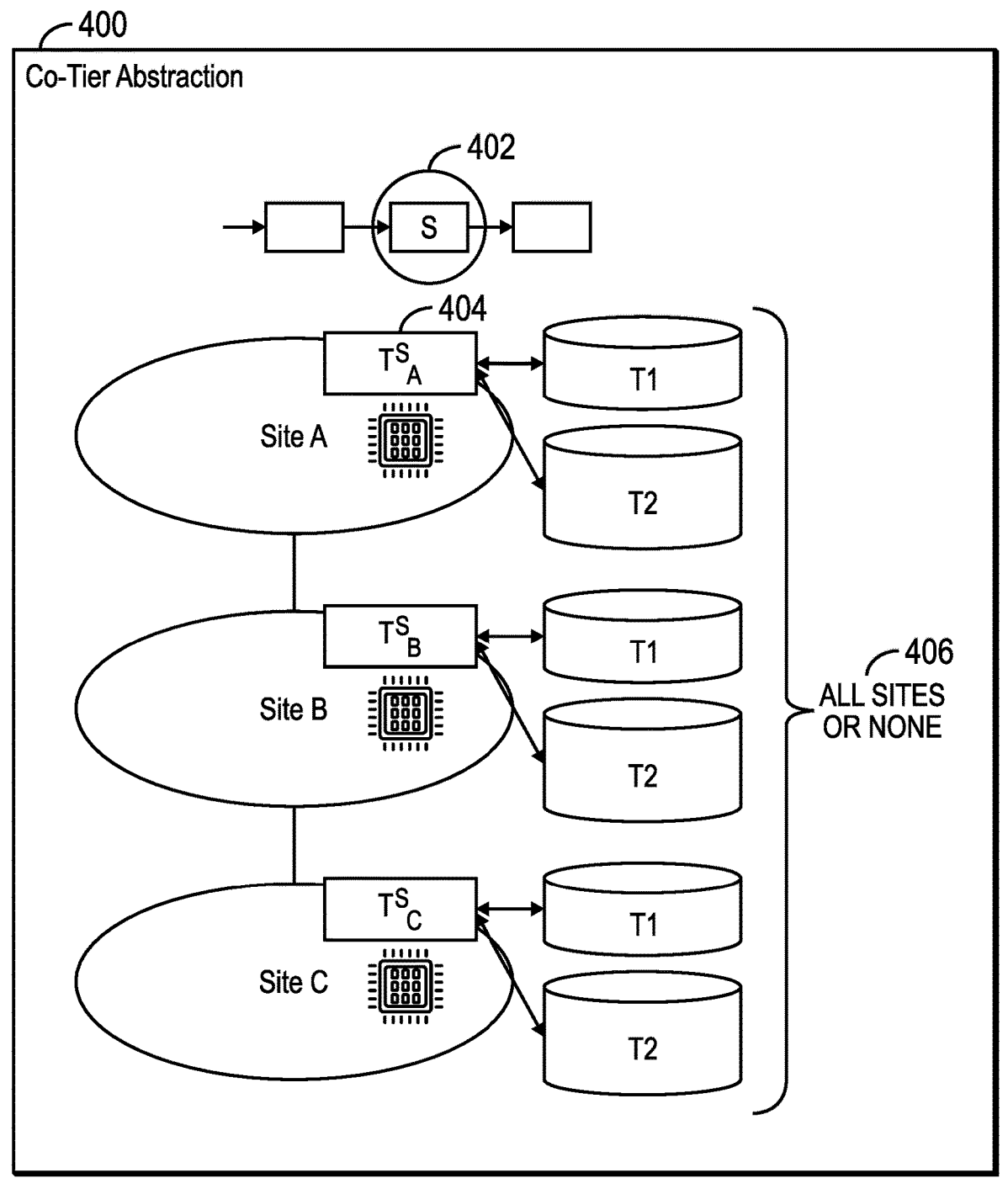
FIG. 4 illustrates a block diagram that shows a co-tier abstraction, in accordance with certain embodiments.

FIG. 4 illustrates a block diagram 400 that shows a co-tier abstraction, in accordance with certain embodiments.

In a Co-Tier intent-driven abstraction, given a stage s that needs to execute across multiple sites, denote a task of stage S 402 executing at site l∈L denoted by $T^s_1$ (as shown in FIG. 4 via at least reference numeral 404).

A co-tier configuration comprises of an abstraction comprising: a storage pool/service class, a vector indexed by sites in L specifying per-site storage capacity requested.

A co-Tier configset is a set of co-Tier configurations, one per storage class.

A co-tier is a prioritized list (in utility order) of co-tier configsets.

Co-tiers support the capability for auto-tuning thereby allowing the system to right-size the co-tier over time.

Co-tiers are specified as intent objects. The geo-distributed dataflow framework is responsible for realizing the intent. It does so by picking the highest priority co-tier configset such that all sites in that configuration can be allocated capacity (as shown via reference numeral 406).

FIG. 5 illustrates a block diagram 500 that shows a co-tier configuration showing exemplary code, in accordance with certain embodiments.

In FIG. 5, a co-tier for a geo-distributed stage called dedup (i.e., deduplication) comprises of 2 candidate config-sets: Co-Tier-ConfigSet1 and Co-Tier-ConfigSet2. Co-Tier-ConfigSet1 requests simultaneously for 400 GB FLASH and 4 TB COS at each candidate site, whereas Co-Tier-Config-Set2 requests simultaneously for 200 GB FLASH and 4 TB COS at each candidate site.

The system tries to satisfy Co-Tier-ConfigSet1 if possible and if not tries to satisfy Co-Tier-ConfigSet2 next due to specified utilities. In each case, the requested storage capac-ity at all sites must simultaneously be satisfied from the specified tier.

In certain embodiments, the system auto-tune Co-Tier-Stage-Dedup's storage tiering automatically over time, via an all-or-nothing style co-tiering in the context of geo-distributed dataflows.

Certain embodiments, therefore, perform all-or-nothing style co-tiering in the context of geo-distributed dataflows. Furthermore, certain embodiments perform multi-tier auto-tuning in the context of the multi-cloud context.

Figure 6:
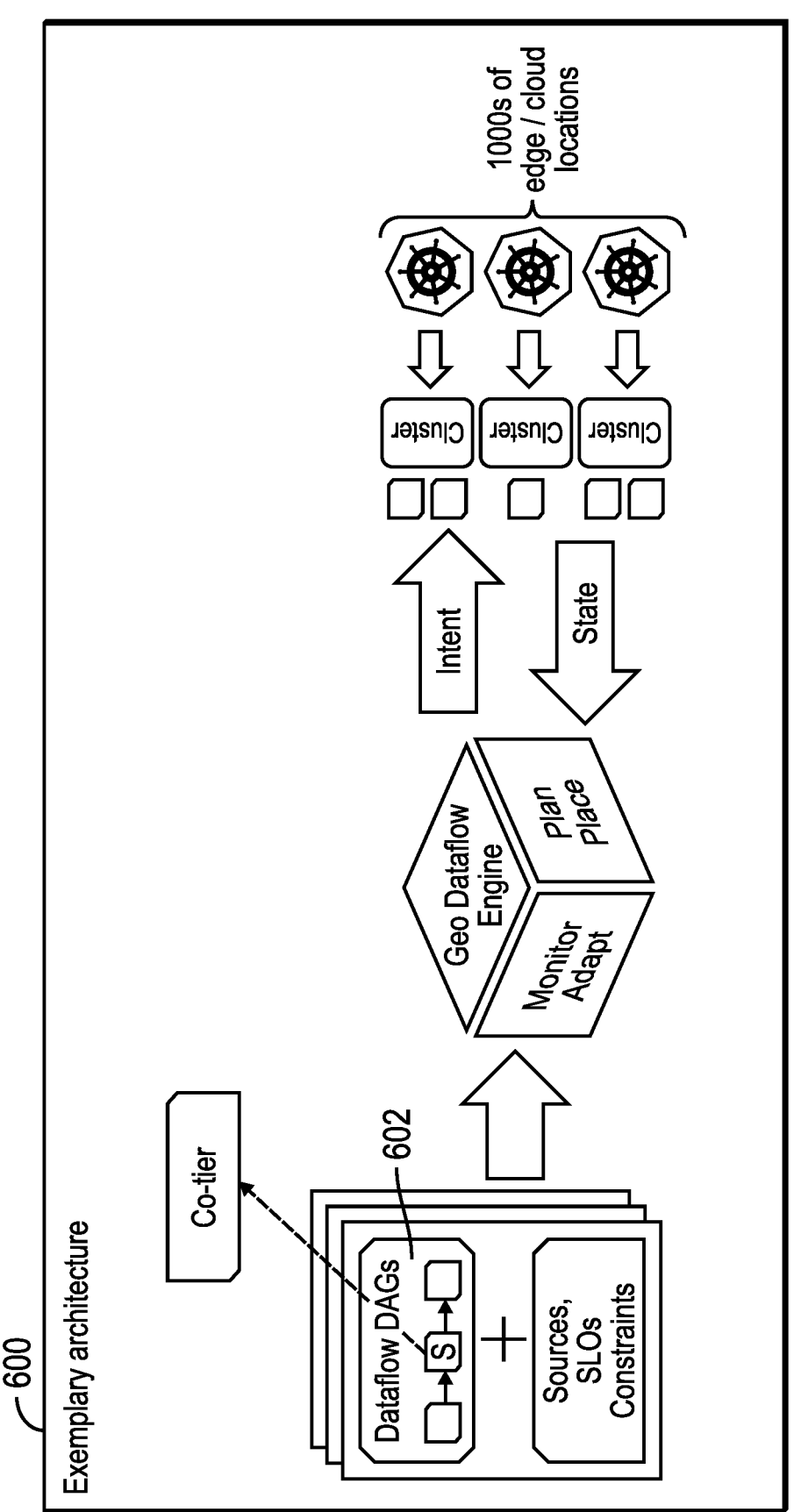
FIG. 6 illustrates a block diagram that shows an exemplary architecture, in accordance with certain embodiments.

FIG. 6 illustrates a block diagram 600 that shows an exemplary architecture, in accordance with certain embodi-ments.

As part of dataflow, a directed acyclic graph (DAG) 602, provide job objectives and data sources. Co-Tiering objec-tives derive from stages such as sort, join, shuffle, group-by etc. that span geo-boundaries. Such stages are explicitly annotated in the DAG specification and contain pointers to Co-Tier Intent objects.

Figure 7:
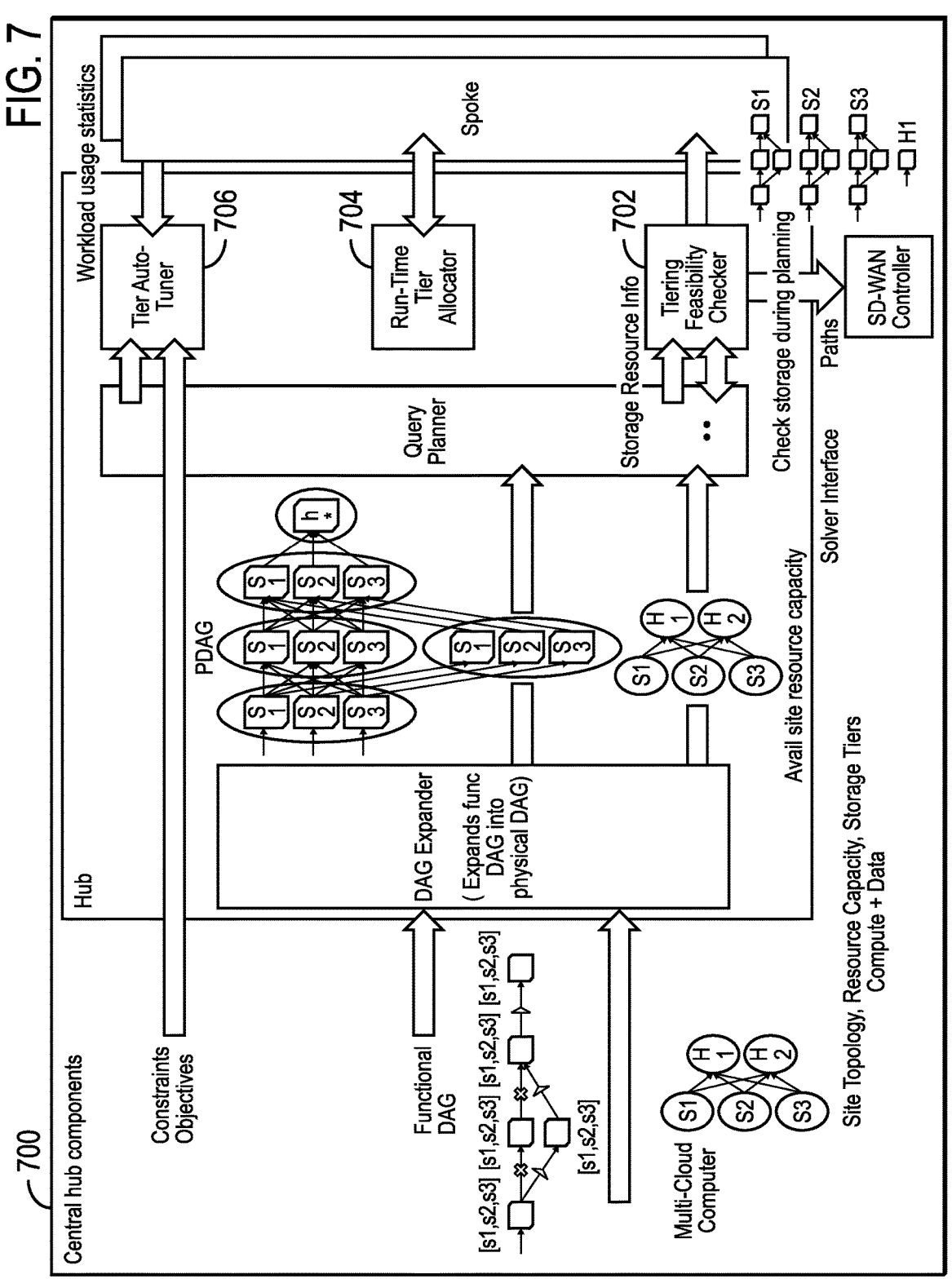
FIG. 7 illustrates a block diagram that shows central hub components, in accordance with certain embodiments.

FIG. 7 illustrates a block diagram 700 that shows central hub components, in accordance with certain embodiments.

The details of components associated with co-tiering are as follows. Tier-feasibility checker 702 checks if the site has appropriate storage tiers requested by stage. Run-time Tier Allocator 704 dynamically allocates appropriate tier to con-cerned set of worker/spoke sites during task scheduling. Auto-tuner 706 continuously downgrades/upgrades tier-al-location to tasks based on run-time workload usage statis-tics.

Certain embodiments assume that geo-distributed jobs are described declaratively as a functional DAG (FDAG) which specify the data-transforms and the dataflow structure of these transforms. This also specifies the candidate data locations, and the objectives and constraints associated with where intermediate data can or cannot be processed or cached.

Certain embodiments assume a geo-distributed topology of clusters that is discovered by the multi-cloud computer.

Certain embodiments assume that this topology also includes the storage capabilities at each cluster including the data capacities at each tier, the storage I/O bandwidth etc.

Certain embodiments assume cost-model/selectivity/car-dinality estimates within the tiering feasibility checker to determine the appropriate storage tier.

Certain embodiments assume the existence of continuous feedback from the storage tier to help the Auto-Tuner and the Tier Feasibility Checker in deciding what the current capacity is. This helps with the auto-tuning, the query planning, and the run-time tier allocation.

As part of the tier-allocation/tuning process, the dataflow engine needs to make following decisions:

(i) Which sites need to be used for implementing inter-mediate stages given the storage configuration options expressed in the intent DAG and given the capabilities discovered from the various clusters.

(ii) Since storage consumption continuously changes in a dynamic cloud environment, what configuration-set points should be chosen for the current stage and how should other storage resources be apportioned across all contending stages/workloads such that the global utility of all tasks in the multi-cluster topology is maximized. If possible, embodiments would also like to balance data capacity and I/O cycles across sites and across tiers.

(iii) Finally, how do embodiments auto-tune/right-size the storage configuration (data capacity and tier-assign-ment) of all stage across all sites based on monitored storage telemetry metrics?

Figure 8:
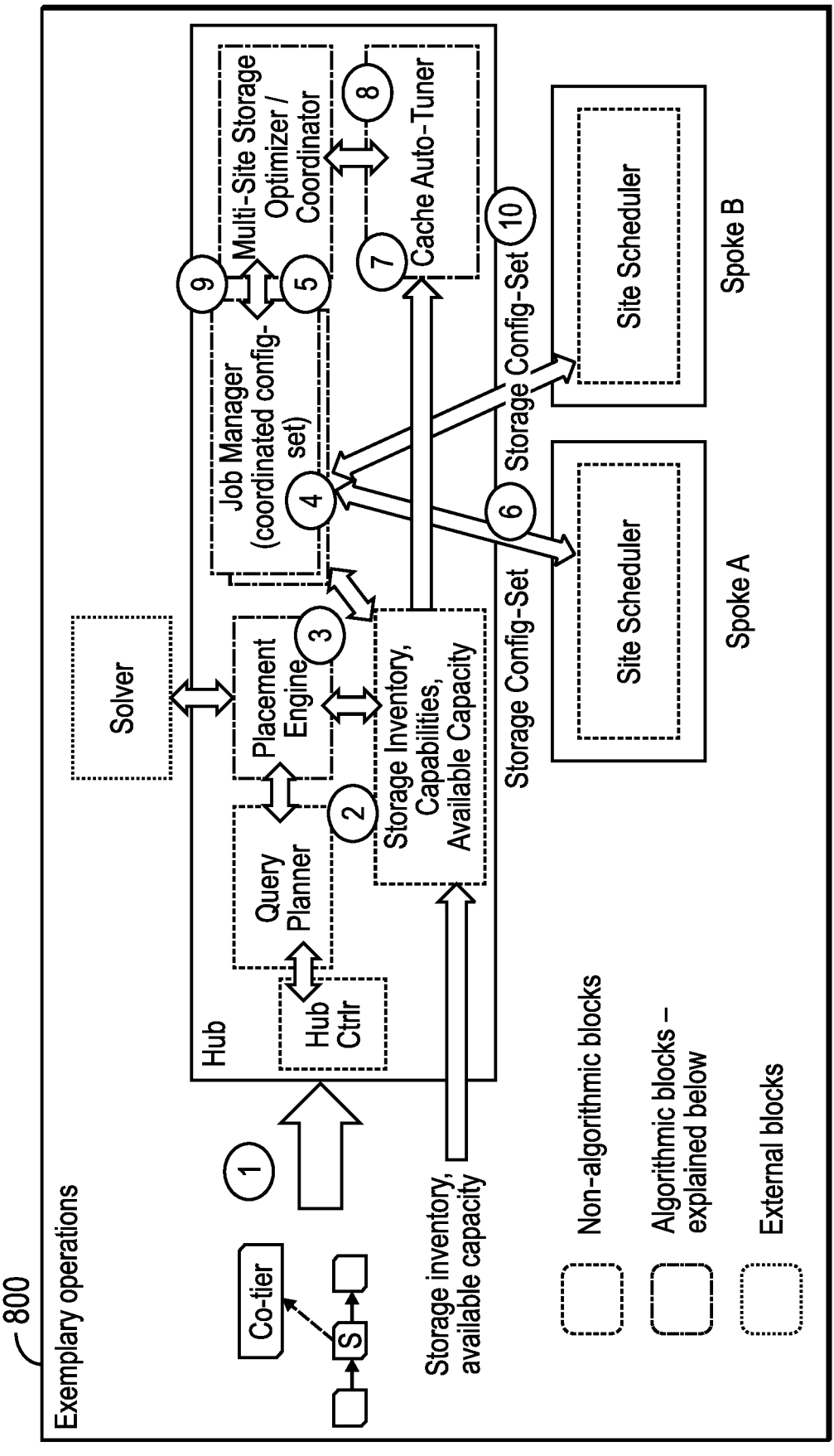
FIG. 8 illustrates exemplary operations, in accordance with certain embodiments.

FIG. 8 illustrates exemplary operations 800, in accor-dance with certain embodiments.

The geo-distributed dataflow DAG along with the co-tiers are submitted to the dataflow engine. The dataflow engine first reorders the graph and picks operator implementations based on cost models.

The dataflow engine then decides on operator placement decisions for each vertex in the geo-distributed DAG in a data governance policy compliant manner. The co-tier capacity constraints are used as constraints in the placement decision.

For example, in a formulation, the "inverse-cost" may be used as a soft constraint for quantifying how attractive (utility) is picking of a site.

In contrast the lowest configuration could be treated as a minimum requirement and if the site cannot meet this requirement, that site is eliminated as a candidate for place-ment of the operator.

These are fed into the solver as constraints and the output results in a valid placement decision.

Once the decision is made, an active job manager is spawned to actively schedule that instance of the geo-flow. A job manager is responsible for scheduling a DAG using a state machine.

When a new stage is scheduled across multiple sites, the job manager informs the optimizer about the tasks to be scheduled. In response, an appropriate tier is chosen by the storage optimizer. The storage optimizer may also decide to move other tasks/entire stages to lower utility points in order to optimize the global utility of all citizens in the ecosystem.

The decision of storage configuration-set made by the optimizer is disseminated to the individual sites. Appropriate adjustments are made at the spoke control planes to enforce the directive.

The auto-tuner is a separate engine that is responsible for learning if the current storage allocation is wasteful or insufficient.

It makes recommendations to the optimizer to lower the tiers of certain workloads that may be wasteful or insuffi-cient based on monitored resource usage. Based on this it can suggest changes in capacity/I/O bandwidth from what is specified in the specification. This is controlled by the auto-tune parameter which tells the system to learn to estimate appropriately the resource capacity of each work-load in that flow.

The results of the utility maximization step within the optimizer are again conveyed back to the job manager. The job manager in turn makes adjustments to the storage configurations and the spoke controller in turn changes the storage configurations for each operator in response.

Figure 9:
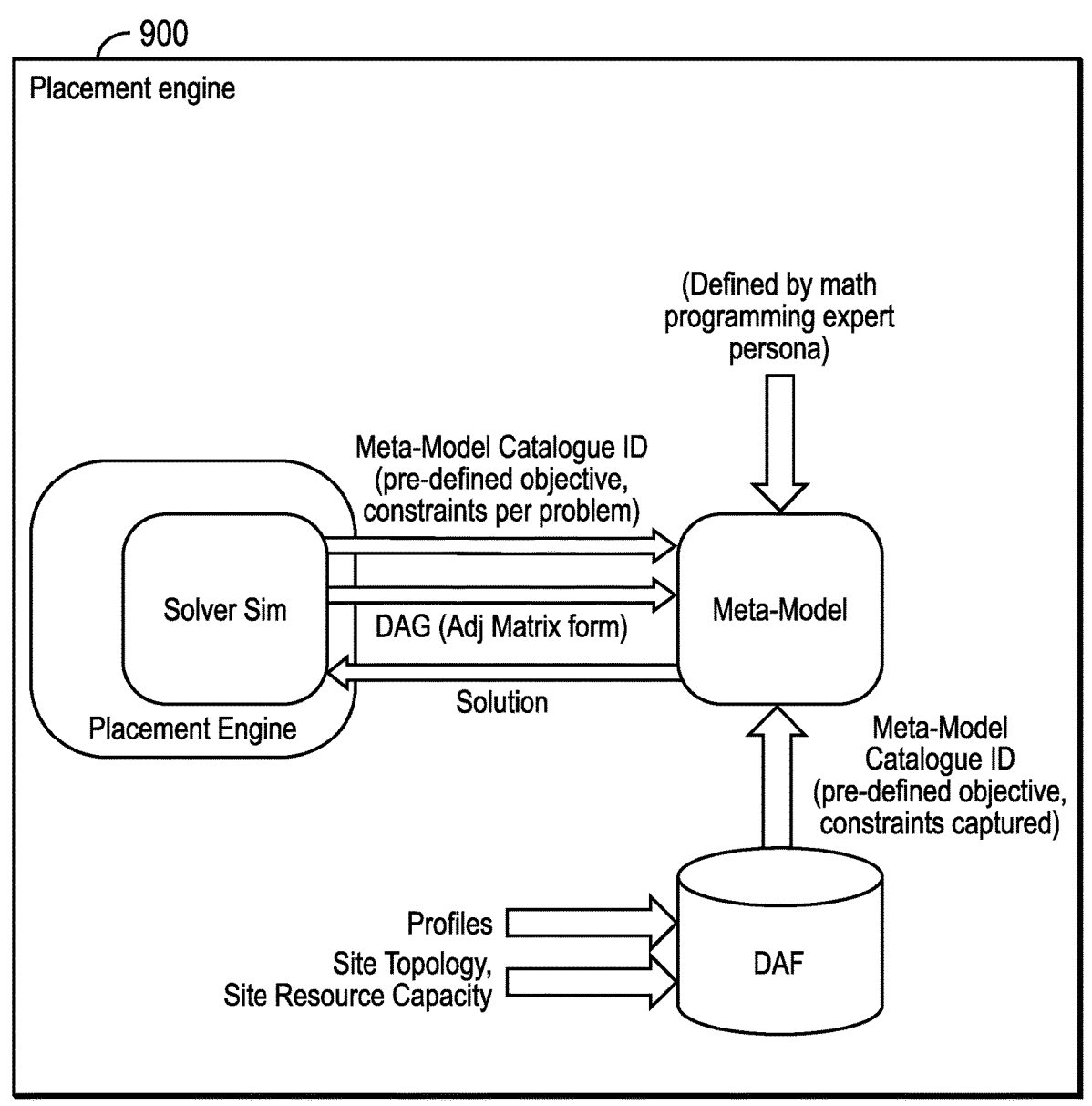
FIG. 9 illustrates a block diagram of a placement engine and associated operations, in accordance with certain embodiments.

FIG. 9 illustrates a block diagram of a placement engine 900 and associated operations, in accordance with certain embodiments.

Placement optimizer has a catalog of problems defined by the meta-model identified by catalog-ID. The meta-model will be enhanced to support storage tier I/O and capacity requirements. This in turn maps to additional storage tier constraints in the CSP (Constraint Satisfaction Problem) solver. A state repository stores the current state of the resource availability and can be consumed by the optimizer piece. This state repository is enhanced to discover the storage tier information from the multi-cluster. This allows the storage tier information to be factored as constraints into the placement decision. This decision process excludes sites that violate the data governance policies of the multi-cluster substrate by disallowing such sites to be picked as candidates even if they have resource capacity.

FIG. 10 illustrates a block diagram of exemplary operations 1000 for choosing appropriate tier, in accordance with certain embodiments.

In one formulation, the inputs to the optimization are as follows: Each co-tier config-set is associated with a resource vector.

Each tier is associated with its corresponding utility. y specified. This becomes a multi-dimensional knapsack problem in computer science.

An approach to solve the problem for each stage is as follows:

Preprocessing:

1. Convert resource demand vectors into composite resources.
2. Sort the points (config-sets) in increasing order of utility.
3. Take the convex hull of this set (to make sure the profiles are convex) based on utility to eliminate non-performing points.
4. Adjust size of storage resource bins at each site by subtracting consumption of higher priority tasks Storage Tier Quality of Service (QoS) Optimization:

1. Initialize all points to their minimum QoS level i.e., lowest utility config-set.
2. Compute marginal utility (delta utility/delta resource) each task can receive by increasing QoS level by one step.
3. Choose task with highest marginal utility and increase its QoS by one step. If unallocated go back to step 2
4. Stop when no more resources can be allocated.

This approach is derived from classic convex optimization theory.

The embodiments can be rerun to recalculate utility-based storage tier allocation whenever tasks complete, new tasks arrive, site capacity changes, or there are site outages. The storage optimizer will thus be able dynamically adapt to these changing situations automatically.

The redistribution management algorithm decides how to best allocate caching tiers across contending tasks. The notion of a miss ratio curve (MRC) captures the notion of how much caching to be allocated in a single tier. Certain embodiments leverage standard techniques in MRC estimation to determine the MRC curve.

The functionality of building MRC profiles, picking appropriate values and cache sizes based on the storage tier options at each site is handled by a Cache Auto-Tuner component. Cache sizes (resource sizes) from these values are then fitted into the storage optimizer for coordinated storage tiering operations.

FIG. 11 illustrates exemplary operations 1100 for coordinated storage tiering across sites, in accordance with certain embodiments.

Control starts at block 1102 in which operations are performed to provide a plurality of configurations that indicate storage requirements of different storage tiers of a tiered storage system for a plurality of sites, wherein each of the plurality of configurations has an associated priority.

Operations are performed (at block 1104) to determine a configuration with a highest priority of the plurality of configurations, wherein storage tiers at each site of the plurality of sites are configurable in an identical manner in accordance with the determined configuration. From block 1104 control proceeds to block 1106 in which the storage tiers of each site of the plurality of sites are configured in the identical manner in accordance with the determined configuration.

Therefore, FIGS. 1-11 illustrate certain embodiments for coordinated storage tiering across sites.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 12:
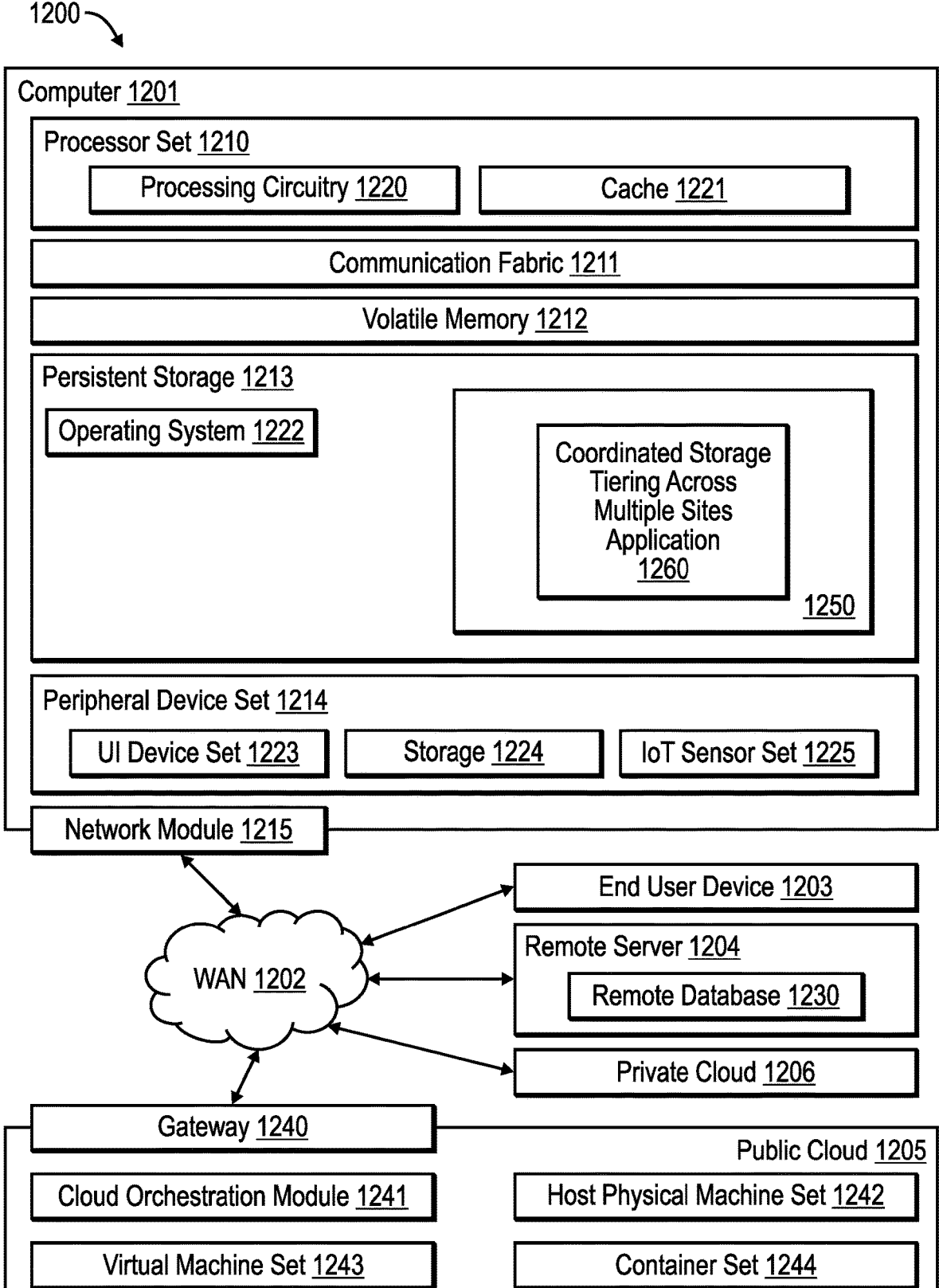
FIG. 12 illustrates a computing environment in which certain components may be implemented, in accordance with certain embodiments.

In FIG. 12. computing environment 1200 contains an example of an environment for the execution of at least some of the computer code (block 1250) involved in performing the operations of a coordinated storage tiering across multiple sites application 1260 that may perform operations shown in FIGS. 1-11.

In addition to block 1250, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1250, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible computer 1201 may be located in a cloud, even though it is not shown in a cloud in FIG. 8. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in block 1250 in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. The code included in block 1250 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. I/O T sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

CLOUD COMPUTING SERVICES AND/OR MICROSERVICES (not separately shown in FIG. 12): private and public clouds 1205, 1206 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method comprising:

providing a plurality of configurations that indicate storage requirements of different storage tiers of a tiered storage system for a plurality of sites, wherein each of the plurality of configurations has an associated priority;

determining a configuration with a highest priority of the plurality of configurations, wherein storage tiers of each site of the plurality of sites are configurable in an identical manner;

determining whether the configuration with the highest priority of the plurality of configurations can be satisfied at each site of the plurality of sites;

in response to determining that the configuration with the highest priority can be satisfied at each site of the plurality of sites, configuring the storage tiers of each site of the plurality of sites in the identical manner in accordance with the configuration for executing tasks corresponding to a stage; and in response to determining that the configuration with the highest priority cannot be satisfied at each site of the plurality of sites, selecting a configuration with a next highest priority configuration at each site of the plurality of sites for executing the tasks corresponding to the stage.

2. The method of claim 1, the method further comprising:

placing a plurality of tasks of a stage across the plurality of sites, wherein each task of the plurality of tasks complete at each site of the plurality of sites within a time period that does not differ from a time period of completion of other tasks of the plurality of tasks by more than a predetermined time period.

3. The method of claim 2, wherein:

each task of the plurality of tasks is an instance of the stage; and the plurality of tasks are distributed among the plurality of sites from a central server.

4. The method of claim 3, the method further comprising:

performing a coordinated storage tiering across the plurality of sites to generate geo-distributed analytics at the central server.

5. The method of claim 1, wherein completion times of a plurality of tasks are achieved in a most cost-efficient and resource-efficient manner possible.

6. The method of claim 1, the method further comprising:

dynamically adapting the plurality of configurations in a coordinated manner across participating sites of a stage in a dynamic setting.

7. The method of claim 1, wherein operations are performed for dynamically right-sizing storage tier resource demands requested by each task at each site based on observed activity for system-wide overall performance and improving overall utilization of all storage tiers at the plurality of sites without affecting stage-wide performance guarantees.

8. A system, comprising:

a memory; and a processor coupled to the memory, wherein the processor performs operations, the operations comprising:

providing a plurality of configurations that indicate storage requirements of different storage tiers of a tiered storage system for a plurality of sites, wherein each of the plurality of configurations has an associated priority;

determining a configuration with a highest priority of the plurality of configurations, wherein storage tiers of each site of the plurality of sites are configurable in an identical manner;

determining whether the configuration with the highest priority of the plurality of configurations can be satisfied at each site of the plurality of sites;

in response to determining that the configuration with the highest priority can be satisfied at each site of the plurality of sites, configuring the storage tiers of each site of the plurality of sites in the identical manner in accordance with the configuration for executing tasks corresponding to a stage; and in response to determining that the configuration with the highest priority cannot be satisfied at each site of the plurality of sites, selecting a configuration with a next highest priority configuration at each site of the plurality of sites for executing the tasks corresponding to the stage.

9. The system of claim 8, the operations further comprising:

placing a plurality of tasks of a stage across the plurality of sites, wherein each task of the plurality of tasks complete at each site of the plurality of sites within a time period that does not differ from a time period of completion of other tasks of the plurality of tasks by more than a predetermined time period.

10. The system of claim 9, wherein:

each task of the plurality of tasks is an instance of the stage; and the plurality of tasks are distributed among the plurality of sites from a central server.

11. The system of claim 10, the operations further comprising:

performing a coordinated storage tiering across the plurality of sites to generate geo-distributed analytics at the central server.

12. The system of claim 8, wherein completion times of a plurality of tasks are achieved in a most cost-efficient and resource-efficient manner possible.

13. The system of claim 8, the operations further comprising:

dynamically adapting the plurality of configurations in a coordinated manner across participating sites of a stage in a dynamic setting.

14. The system of claim 8, wherein operations are performed for dynamically right-sizing storage tier resource demands requested by each task at each site based on observed activity for system-wide overall performance and improving overall utilization of all storage tiers at the plurality of sites without affecting stage-wide performance guarantees.

15. A computer program product, the computer program product comprising a computer readable storage medium having computer readable program code embodied therewith, the computer readable program code when executed is configured to perform operations, the operations comprising:

providing a plurality of configurations that indicate storage requirements of different storage tiers of a tiered storage system for a plurality of sites, wherein each of the plurality of configurations has an associated priority;

determining a configuration with a highest priority of the plurality of configurations, wherein storage tiers of each site of the plurality of sites are configurable in an identical manner;

determining whether the configuration with the highest priority of the plurality of configurations can be satisfied at each site of the plurality of sites;

in response to determining that the configuration with the highest priority can be satisfied at each site of the plurality of sites, configuring the storage tiers of each site of the plurality of sites in the identical manner in accordance with the configuration for executing tasks corresponding to a stage; and in response to determining that the configuration with the highest priority cannot be satisfied at each site of the plurality of sites, selecting a configuration with a next highest priority configuration at each site of the plurality of sites for executing the tasks corresponding to the stage.

16. The computer program product of claim 15, the operations further comprising:

placing a plurality of tasks of a stage across the plurality of sites, wherein each task of the plurality of tasks complete at each site of the plurality of sites within a time period that does not differ from a time period of completion of other tasks of the plurality of tasks by more than a predetermined time period.

17. The computer program product of claim 16, wherein:

each task of the plurality of tasks is an instance of the stage; and the plurality of tasks are distributed among the plurality of sites from a central server.

18. The computer program product of claim 17, the operations further comprising:

performing a coordinated storage tiering across the plurality of sites to generate geo-distributed analytics at the central server.

19. The computer program product of claim 15, wherein completion times of a plurality of tasks are achieved in a most cost-efficient and resource-efficient manner possible.

20. The computer program product of claim 15, the operations further comprising:

dynamically adapting the plurality of configurations in a coordinated manner across participating sites of a stage in a dynamic setting.

* * * * *